United States Patent Office 3,158,652
Patented Nov. 24, 1964

3,158,652
PREPARATION OF ALKYLATED DECABORANE
Robert K. Jordan, Tonawanda, N.Y., assignor, by mesne assignments, to Olin Mathieson Chemical Corporation, a corporation of Virginia
No Drawing. Filed Oct. 31, 1955, Ser. No. 544,067
5 Claims. (Cl. 260—606.5)

This invention relates to a new process for the preparation of liquid alkylated decaboranes. The materials produced by the process can be employed as fuels in the manner described in Altwicker, Garrett, Harris and Weilmuenster application Serial No. 497,407, filed March 28, 1955 and issued as U.S. Patent No. 2,999,117 on Sept. 5, 1961.

It is known in the art to prepare decaborane. The material is a stable, white crystalline solid which melts at 99.5° C. and which boils at 213° C. Decaborane is a boron hydride of very high boron content. It has a very high heat of combustion indicating its utility as a high energy fuel. Being a solid, however, decaborane is not conveniently handled and this detracts from its utility for fuel purposes.

In accordance with the present invention, it has been discovered that decaborane and alkyl monohalides having from 1 to 5 carbon atoms in the alkyl radical can be reacted in admixture with aluminum to form alkylated decaboranes. The alkylated decaboranes produced by the reaction using aluminum as the alkylation catalyst contain from 1 to 6 alkyl groups attached to each decaborane nucleus. The products produced in accordance with the present invention are borohydrocarbons of relatively high boron content and at the same time they are liquids, so that they constitute a conveniently handled fuel of considerably greater energy content than the simple hydrocarbon fuels.

The following examples illustrate in detail various procedures falling within the scope of this invention but are to be considered not limitative thereof.

Example 1

In this experiment granular aluminum (8 mesh) was used as an alkylation catalyst in the reaction of decaborane with ethyl bromide.

Decaborane, 12.2 g. (0.1 mole), ethyl bromide, 21.8 g. (0.20 mole), and aluminum, 0.55 g. (0.02 g. atom), were mixed in a 200 ml. flask equipped with a magnetic stirrer and heated to an external temperature of 85° C. at which time heating was discontinued. After approximately ten minutes a yellow coloration in the reactants was noted. Then the evolution of hydrogen bromide began slowly and increased steadily. At the end of ten minutes, when 0.124 mole of hydrogen bromide had been evolved, the reaction was stopped by the addition of 50 ml. of distilled water to the reaction mixture. Next, the reaction mixture was dissolved in 40 ml. of diethyl ether and washed with four 40 ml. portions of distilled water. Gas evolution and deposition of solids indicated that decomposition was occurring. The ether was removed by distilling the reaction mixture at a reduced pressure and 11.04 g. of liquid boiling at 67°–97° at 0.75 mm. of Hg was collected. Approximately 1.2 g. of decaborane was recovered during the first part of the distillation. The yield of liquid product was 82 percent assuming that only the monoalkyl product was formed. Some solids remained in the distilling flask at the conclusion of the distillation. The liquid was identified by infrared analysis as a mixture and was primarily mono- and diethyldecaborane. Chemical analysis showed that the boron content of the liquid was 62.8 percent by weight.

Various modifications can be made in the procedures of the specific examples to provide other embodiments which fall within the scope of this invention. Thus, in place of the ethyl bromide and ethyl chloride utilized as reactants, there can be substituted equivalent amounts of other alkyl monohalides having from 1 to 5 carbon atoms, such as methyl bromide, methyl chloride, methyl iodide, ethyl iodide, n-propyl chloride, isopropyl chloride, n-butyl chloride, isobutyl bromide, secondary butyl chloride, tertiary butyl iodide, n-amyl chloride, n-amyl bromide, and the like. The relative proportions of alkyl monohalide and decaborane used can be varied widely, generally being within the range from about 0.5 mole of alkyl halide to 1 mole of decaborane to 10 moles of alkyl halide to 1 mole of decaborane. The preferred range for the molar ratio of alkyl halide to decaborane is from 1 mole of alkyl halide to 1 mole of decaborane to 3 moles of alkyl halide to 1 mole of decaborane. If desired, the reaction can be conducted in such manner that excess alkyl halide serves as a solvent for the reactants, and in commercial practice it may be advantageous to operate with large excesses of decaborane. The use of solvents as a reaction medium permits the reaction to proceed in liquid phase to give products which have substantially higher boron contents and at the same time results in increased conversions. Saturated straight chain hydrocarbons such as n-pentane or kerosene or chlorinated solvents of the methylene chloride type are satisfactory. When low boiling solvents are used, pressure can be employed for the purpose of retaining the solvent in the liquid phase.

The quantity of aluminum employed as a catalyst can also be varied considerably generally being within the range from about 0.01 mole of aluminum per mole of decaborane to 0.4 mole of aluminum per mole of decaborane. Likewise, the reaction temperature used is subject to considerable variation, generally being within the range from 0° C. to 100° C.

It is claimed:
1. A method for the preparation of an alkylated decaborane which comprises reacting decaborane and an alkyl monohalide selected from the class consisting of alkyl monochlorides, alkyl monobromides and alkyl monoiodides having from 1 to 5 carbon atoms while the reactants are in admixture with as an alkylation catalyst a catalytic amount of a material consisting essentially of aluminum.
2. The method of claim 1 wherein the molar ratio of alkyl monohalide to decaborane is within the ratio from 0.5:1 to 10:1, wherein the molar ratio of aluminum to decaborane is within the range from 0.01:- to 0.4:1 and wherein the reaction temperature is within the range from 0° C. to 100° C.
3. The method of claim 2 wherein the alkyl monohalide is ethyl bromide.
4. The method of claim 2 wherein the alkyl monohalide is ethyl chloride.
5. A method for preparing an alkyl decaborane which comprises reacting decaborane and a lower alkyl monohalide in the presence of aluminum as the catalyst and recovering the alkyl decaborane produced.

References Cited by the Examiner

Grosse et al.: Journal of Organic Chemistry, vol. 5, pages 106–21 (1940).

TOBIAS E. LEVOW, *Primary Examiner.*

WILLIAM G. WILES, LEON D. ROSDOL, ROGER L. CAMPBELL, *Examiners.*